United States Patent
Alberdi et al.

(10) Patent No.: US 12,524,327 B2
(45) Date of Patent: Jan. 13, 2026

(54) AUTOMATED PUBLIC CERTIFICATION OF SPECIFICATIONS AND SOFTWARE

(71) Applicant: Formal Vindications SL, Catalonia (ES)

(72) Inventors: Guillermo Errezil Alberdi, Irun (ES); Mireia Gonzalez Bedmar, Valencia (ES); Eduardo Hermo Reyes, Barcelona (ES)

(73) Assignee: Formal Vindications SL, Barcelona (ES)

( * ) Notice: Subject to any disclaimer, the term of this patent is extended or adjusted under 35 U.S.C. 154(b) by 316 days.

(21) Appl. No.: 18/523,339

(22) Filed: Nov. 29, 2023

(65) Prior Publication Data

US 2024/0176722 A1    May 30, 2024

Related U.S. Application Data

(60) Provisional application No. 63/428,929, filed on Nov. 30, 2022.

(51) Int. Cl.
G06F 11/3604    (2025.01)
(52) U.S. Cl.
CPC ................ G06F 11/3608 (2013.01)
(58) Field of Classification Search
CPC .................................. G06F 11/3608
See application file for complete search history.

(56) References Cited

U.S. PATENT DOCUMENTS

| | | | |
|---|---|---|---|
| 7,237,208 B1 | 6/2007 | Ip et al. | |
| 7,346,486 B2 | 3/2008 | Ivancic et al. | |
| 7,930,659 B2 | 4/2011 | Ivancic et al. | |
| 9,069,893 B2 * | 6/2015 | Vechev | G06F 9/44589 |
| 10,109,010 B2 | 10/2018 | Ignatovich et al. | |
| 10,515,169 B1 * | 12/2019 | Spatafore | G06F 30/3323 |
| 10,839,124 B1 * | 11/2020 | Leder | G06F 30/33 |
| 11,188,695 B2 | 11/2021 | Korchemny et al. | |
| 11,544,436 B1 | 1/2023 | Leder et al. | |
| 11,797,317 B1 * | 10/2023 | McLaughlin | G06F 8/43 |

(Continued)

FOREIGN PATENT DOCUMENTS

| | | | | |
|---|---|---|---|---|
| CN | 110989997 A | * | 4/2020 | ............... G06F 8/31 |
| CN | 113282492 A | * | 8/2021 | ........... G06F 9/4498 |

OTHER PUBLICATIONS

Lin, Zhengyao, et al. "Trustworthy program verification via proof generation." (2021).*

(Continued)

*Primary Examiner* — Francisco J Aponte
(74) *Attorney, Agent, or Firm* — K&L Gates LLP

(57) ABSTRACT

Systems and methods to publicly certify a specification and its corresponding software for a software project. A publicly certified specification and its software can consist of a verified software that comes with an interpretation of the formal specification written in some accessible language, in such a way that at least an individual with mathematical training can check that the translation from the formal specification to a human language is, up to some extent, correct. The systems and method provided herein generate and revise a technical specification, a formal specification, algorithmic code and formally verified code for compilation and execution as a formally verified program.

20 Claims, 7 Drawing Sheets

(56) References Cited

U.S. PATENT DOCUMENTS

| | | |
|---|---|---|
| 2014/0351801 A1 | 11/2014 | Shin et al. |
| 2015/0227411 A1 | 8/2015 | Yi et al. |
| 2016/0098562 A1* | 4/2016 | Hawblitzel ............... G06F 8/41 |
| | | 726/22 |
| 2017/0139678 A1* | 5/2017 | Funakoshi ................ G06F 8/10 |
| 2018/0088913 A1* | 3/2018 | Portes ................ G06F 9/30007 |
| 2019/0278884 A1* | 9/2019 | Surisetty ................ G06F 30/30 |

OTHER PUBLICATIONS

Wagner, Lucas G., et al. Formal methods tool qualification. No. NF1676L-25881. 2017.*

Pinote, Thomas Sibut. Investigations in computer-aided mathematics: experimentation, computation, and certification. Diss. Université Paris Saclay (COmUE), 2017.*

White et al.; 2017 Formal verification: will the seeding ever flower? Phil. Trans. R. Soc. A 375; 20150402. http://dx.doi.org/10.1098/rsta.2015.0402.

Wiels et al.; Formal Verification of Critical Aerospace Software; Aerospace Lab, 2012, 4, p. 1-8, hal-01184099.

Zhou et al.; A Formal Verification Method for the SOPC Software; IEEE Transactions on Reliability, vol. 71, No. 2, Jun. 2022.

\* cited by examiner

AUTOMATED PUBLIC CERTIFICATION OF SPECIFICATIONS AND SOFTWARE

CROSS-REFERENCES TO RELATED APPLICATIONS

This U.S. Non-provisional application claims the benefit of priority to U.S. Provisional Application No. 63/428,929, filed on Nov. 30, 2022 and titled "PUBLIC CERTIFICATION OF A SPECIFICATION AND ITS SOFTWARE", which is hereby incorporated by reference in its entirety.

BACKGROUND

There are several ways to check that software does what it is supposed to do. One way is dynamic testing, which tests the result of the software for controlled cases for which the correct answer is known (in some cases, the correct answer is computed by hand, or using another system, like comparing speed from GPS to speed of the vehicle measurement system). The majority of software is tested in this manner. The correctness of the software, however, is not guaranteed because not all cases have been tested.

Another technique is formal verification, which applies mathematical methods to prove with all certainty that the software satisfies certain properties. Depending on which properties of the software are proven, the result can be a guarantee that the software is correct. There are two primary techniques for performing formal verification: model checking and through proof assistants. Model checking uses a tool called a "model checker" to make sure that some properties about the software are true. It has a major drawback. If the model checker to be used is itself verified, then the properties that can be checked are only very simple properties. But if models checker that is able to verify the full properties needed, then the model checker itself is not verified and could have bugs.

A proof assistant is a computer language in which code, mathematical statements about the code, and mathematical proofs that then are checked by the proof assistant can be written. Proof assistants are the only known method that can provide full certainty on the correctness of the software in most cases. Coq, Isabelle and Agda are examples of proof assistant languages.

Formal verification involves obtaining mathematical proof that software behaves according to a formal-language specification. This is usually enough to ensure the absence of mathematical and physical bugs in the code. The pitfall here is that a formal-language specification is not usually directly understandable for humans. This is one of the biggest holes in the mathematics of computer science: What can be proven cannot be understood, and what can be understood cannot be proven. The consequence is that, even if software is formally verified, bugs can arise due to the misunderstanding of the original idea of the specification, resulting in a formalization that does not behave as expected.

Software can be "privately certified" by means of formal verification. Such private certification by formal verification typically generally involves the following requirements: (1) the software is based on a formal specification (in a formal language); (2) the formal specification is mathematically proven to follow all basic mathematical properties (unambiguity, consistency, etc.); (3) the formal specification follows physical and computational limits (it is a representation of some part of the physical world and can be computed); and (4) the software is mathematically proven to follow the formal specification.

When designing software, humans have in mind an intuitive specification, which then is translated to a formal specification, but there is no guarantee that the translation keeps the intended meaning. Even more, depending on the level of abstraction of the language used, the same specification can be understood differently by two different people, i.e., it can be ambiguous. In general, the equivalence between two different abstraction levels of language specification cannot be proven, i.e., this gap between different languages cannot be completely overcome.

SUMMARY

In one general aspect, the present invention is directed to systems and methods for publically certifying a specification and its corresponding software for a software project. A publicly certified specification and its software can consist of a verified software that, moreover, comes with an interpretation of the formal specification written in some accessible language, in such a way that at least an individual with mathematical training can check that the translation from the formal specification to a human language is, up to some extent, correct.

Public certification is needed because, from experience, it is known that even experts in formal verification and in a particular formal language have a hard time understanding another team's formal specification if it does not come suitably documented. Therefore, public certification intends to fill the gap between a claim that "a software is formally verified" and the actual formal work that has been done. In particular, proving arbitrary theorems about a software does not guarantee that it behaves as the user expects; the theorems must be significant. Then, public certification is possible in the moment that the interpretation that makes understandable the formal verification process is obtained. Following this method, any team can verify all the chain from the interpretation to the extracted code, and in the moment one team shares its results with others in this manner it can be called a "public certification" because there is a common system to understand all the process, including the meaning of the formal specification. These and other benefits that can be realized through embodiments of the present invention will be apparent from the description that follows.

FIGURES

Various embodiments of the present invention are described herein by way of example in connection with the following figures.

DETAILED DESCRIPTION

Figure 1:
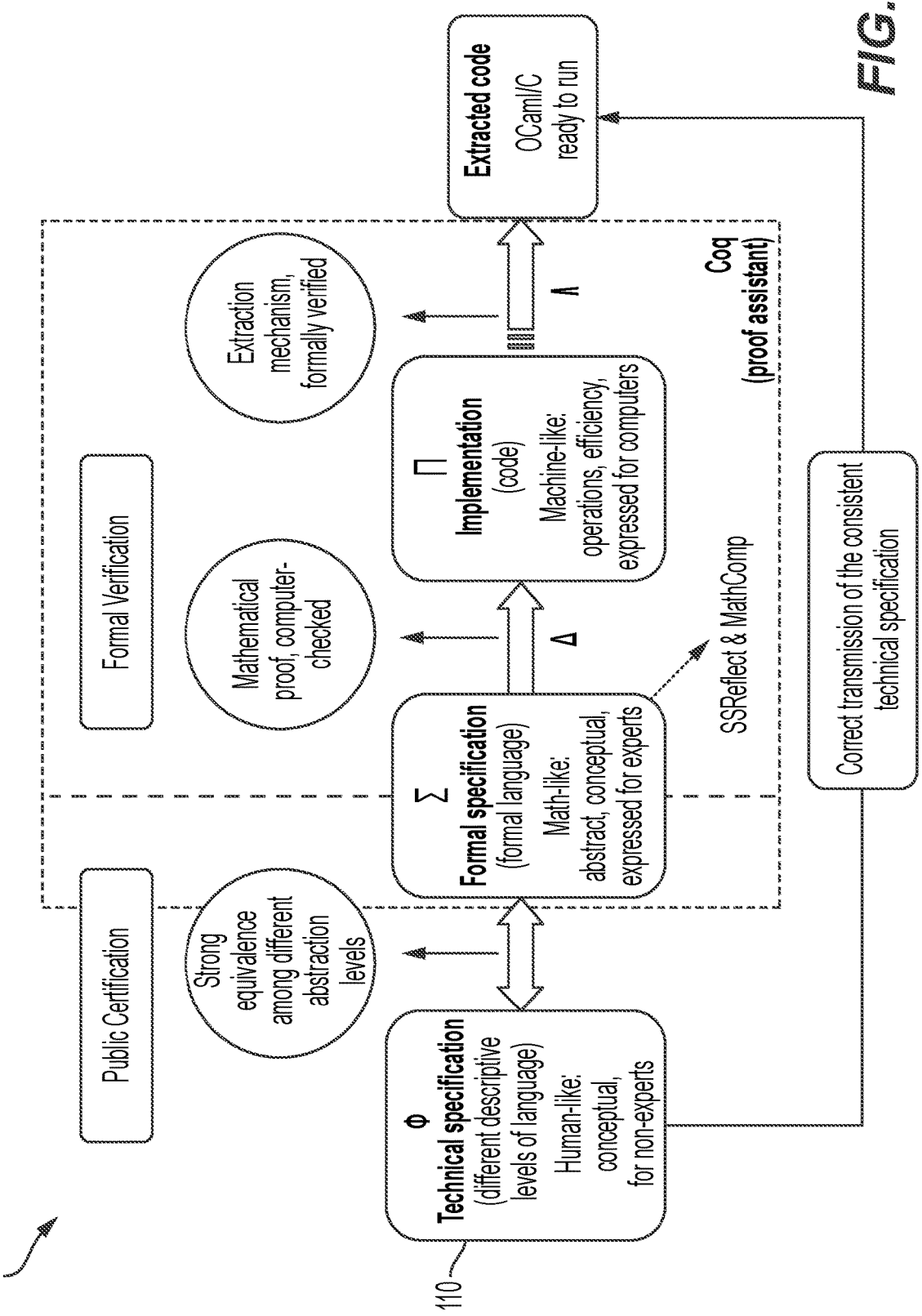
FIG. 1 is diagram of a system for publically certifying a specification for software according and automatically generating verified software code from the publically certified specification according to various embodiments of the present invention.

According to various embodiments of the present invention, a public certification of software generally has six requirements: 1. The software is based on a formal specification (in a formal language). 2. The formal specification is mathematically proven to follow all basic mathematical properties (unambiguity, consistency, etc.). 3. The formal specification follows physical and computational limits (it is a representation of some part of the physical world and can be computed). 4. The software is mathematically proven to follow the formal specification. 5. The formal specification has an equivalent formulation (an interpretation) closer to natural language. 6. The previous items can be checked by anyone with enough knowledge, and it has been done at least once by some party or system.

If a project is limited to requirements 1-4, then it can be designated as "privately certified", by means of formal verification. The presence of the fifth and sixth requirements means that the software is publicly certified.

Formal verification is obtaining mathematical proof that the software behaves according to a formal language specification. This is usually enough to ensure the absence of mathematical and physical bugs in the code. The pitfall here is that a formal-language specification is not usually directly understandable for humans. This is one of the biggest holes in the mathematics of computer science: What can be proven cannot be understood, and what can be understood cannot be proven. The consequence is that, even if we have formally verified software, bugs can arise due to the misunderstanding of the original idea of the specification, resulting in a formalization that does not behave as expected.

In the realm of software design, humans have in mind an intuitive specification which then is translated to a formal specification, but there is no guarantee that the translation keeps the intended meaning and human errors can creep into the formal specification. Even more, depending on the level of abstraction of the language used, the same specification can be understood differently by two people, i.e., it can be ambiguous or unclear. In general, the equivalence between two different abstraction levels of language specification cannot be proven, i.e., this gap between different languages cannot be completely overcome. However, techniques of public certification are disclosed herein that narrow it considerably.

Publicly certified specification and its software consists of a verified software that, moreover, comes with an interpretation of the formal specification written in some accessible language, in such a way that at least an individual with mathematical training can check that the translation from the formal specification to a human language is, up to some extent, correct. This disclosure presents various systems and methods for the public specification of a specification and its software. The present document presents a project, interpretation, or initial technical specification is referred to as (D. Therefore, Public certification means that not only the software is formally verified, but also there is a way for humans (and not only machines) to access and understand what exactly has been verified.

In various embodiments, a concept of verified software (yet not publicly verified software) is given by a 4-tuple ($\Sigma$, $\Pi$, $\Delta$, $\Lambda$) written in a formal language (such as, Coq) as follows:

$\Sigma$ is the formal specification, i.e., an abstract description of what the software should do. It is usually composed of mathematical definitions (not very algorithmic in nature) and statements (theorems).

$\Pi$ is an implementation fulfilling $\Sigma$. It consists of more algorithmic code (and types) pursuing computational efficiency.

$\Delta$ is the mathematical proof (e.g., in Coq) that $\Pi$ fulfills $\Sigma$, i.e., that the implementation is correct with respect to the specification.

$\Lambda$ is the formally verified extraction process using an executable language (such as OCaml/C).

Publicly certified software as defined herein is provided by a (4+1)-tuple ($\Sigma$, $\Pi$, $\Delta$, $\Lambda$, $\Phi$, where: ($\Sigma$, $\Pi$, $\Delta$, $\Lambda$) is a verified software, and $\Phi$ realizes points 5 and 6 of the definition of the public certification of software where it is: a) An interpretation of the specification $\Sigma$ is written in an accessible language for human comprehension, the closest possible to $\Sigma$, via the systems and methods defined herein, to prevent the most common bugs caused by "misunderstandings" or misalignments between code and technical specifications (point 5 above); and b) The guarantee that the public certification of a specific software made by a team can be reached with the same result by other teams, i.e., results can be replicated.

If the software behaves in any unexpected way, the systems and methods disclosed herein guarantees that only $\Phi$ needs to be revisited and/or revised. The mathematical proof $\Delta$ serves as a guarantee that the implementation of the code $\Pi$ follows the formal specification $\Sigma$ even without a natural-language interpretation of the formal specification. Inside a formal framework, specifications are unambiguous and precise. Stepping out of the formal framework and formulating a specification in natural language, proving that it is equivalent to the formal specification is impossible. Also natural language specifications may have no equivalents, or may not make sense, or be too unclear and unambiguous. This means that there is a gap between formal and natural language in specifications.

The problem arises especially in the context of software used in real-world applications. Sometimes, the user can only express a specification in natural language. The jump to formal language in these instances is risky and makes choices among possible interpretations difficult.

Inside a formal framework, specifications are unambiguous and precise. But stepping out of the formal framework and formulating a specification in natural language, then proving that it is equivalent to the formal specification is impossible. Also natural language specifications may have no equivalents, or may not make sense, or be too unclear and unambiguous. This means that there is a gap between formal and natural language in specifications.

The extraction A of the code through formal verification can be performed with or by a proof assistant, which is explained further below. Software formally verified through a proof assistant has three main parts. First is a formal specification, which is a description in a formal (mathematical) language of what the software is supposed to do. It is expressed in an abstract way, good for human understanding, but not well for computation. Second is code/implementation, which is the code that is mean for execution, with computer operations. It is not adequate for human reading because it expresses a series of very concrete steps that the computer must follow. Third are proofs, which are mathematical proofs that show the correctness of the code, i.e., show that the code behaves as the formal specification says it should. Other properties can also proven, such as the consistency of the specification, the fact that the code is within the computational limit, etc. The proof assistant also exports the code to a language (like C, Java, Python, OCaml, etc.) that can run in a computer. This process is called extraction. For the software to be truly verified, the extraction process should be formally verified as well.

In various embodiments, the proof assistant can use Coq. Coq is an interactive theorem prover. It implements a program specification and mathematical higher-level language called Gallina that is based on an expressive formal language called the Calculus of Inductive Constructions that itself combines both a higher-order logic and a richly-typed functional programming language. Through a vernacular language of commands, Coq allows: to define functions or predicates, that can be evaluated efficiently; to state mathematical theorems and software specifications; to interactively develop formal proofs of these theorems; to machine-check these proofs by a relatively small certification "kernel"; to extract certified programs to languages like OCaml, Haskell or Scheme. As a proof development system, Coq provides interactive proof methods, decision and semi-decision algorithms, and a tactic language for letting the user define its own proof methods. Connection with external computer algebra system or theorem provers is available. Coq is preferred for the proof assistant because is made and maintained by the National Institute for Research in Digital Science and Technology in France; is written in the OCaml computer language; and can be extracted to the OCaml and C languages. OCaml can run on Linux and Windows. The OCaml compiler is not verified, so that could be an issue. C has a verified compiler, CompCert.

The following describes a preferred structure of the text for the technical specification $\Phi$ according to various embodiments. $\Phi$ forms the basis of the systems and methods described herein. As to preliminary content, the technical specification $\Phi$ preferably starts with an introduction giving the necessary context of the field and/or methods used to understand the rest of the text. In several aspects, several items should be met. In one aspect, the technical specification $\Phi$ includes a description of the context and real-world purpose of the software. When writing verified software, the initial specification is never the formal specification written in the proof assistant. Instead, the formal specification comes from an original idea, which is usually formulated in a document $\Theta$ not in formal language. This document $\Theta$ acts as a bridge to connect $\Phi$ with the original idea, and hence, to face the problem of bugs that come from the misunderstanding of its behavior. $\Phi$ describes almost perfectly the formal specification $\Sigma$ in a more suitable language. The more precisely the document $\Theta$ is written, the easier it is to find bugs in the document $\Theta$ (i.e., lack of correspondence with $\Phi$).

Also, in various aspects, the technical specification $\Phi$ includes a description of the file structure of the code project, including a diagram with the dependency of the files and explanations of what is to be found at each file, what role each file serves in the project, etc. It is also recommended to include, if applicable, a high-level description of particular methods used (other than regular Coq+MathComp programming and proving). Still further, it is required preferably to include a description of the treatment of reserved words as described below.

Referring again to FIG. 1, various embodiments of the present invention are directed to methods for public verification of software. If the software behaves in any unexpected way, this method guarantees that just $\Phi$ must be revisited. Generally it is to be understood that $\Phi$ is written in more accessible levels of language. The method can comprise generating the formal specification $\Sigma$ from the pre-technical specification $\Theta$ for the software. The pre-technical specification is a document that describes the original idea for the specification, prior to the formal specification $\Sigma$ or the technical specification $\Phi$. The formal specification $\Sigma$ can be composed of mathematical description and theorem that are based on the pre-technical specification $\Theta$. Based on the formal specification $\Sigma$, and using a proof management computer system 10 that implements a Coq proof management system, algorithmic code $\Pi$ can be generated automatically, semi-automatically, or produced by a programmer. The algorithmic code $\Pi$ implements the formal specification $\Sigma$ and can be generated automatically/semi-automatically and/or written manually using the mathematical proof/proof mechanism $\Delta$ (e.g., via Coq) wherein $\Pi$ fulfills $\Sigma$. For example, $\Pi$ gets extracted to executable code via $\Lambda$, where $\Lambda$ is the automatic verified extraction process that proves/ensures that $\Pi$ fulfills/corresponds to $\Sigma$. In addition, from the formal specification $\Sigma$ the technical specification $\Phi$ is generated semi-automatically, or automatically, for example via a computing program that is fully or partially automated, where partial automation means some inputs or responses by a user is necessary to generate the $\Phi$.

Also, the proof management computer system 10 can extract, from the algorithmic code $\Pi$, formally verified code 12 in an executable language. The verified code 12 can be extracted using the automated extraction mechanism $\Lambda$, which could for example comprise an executable computing program, which allows the verified executable code 12 to be obtained, because that mechanism $\Lambda$ is what guarantees that the executable code 12 preserves the verification.

The method can therefore include generating a technical specification $\Phi$ from the formal specification $\Sigma$, and in some aspects also by using the algorithmic code $\Pi$ and the mathematical proof $\Delta$, and carry this out via a semi-automated or automated extraction mechanism $\Sigma$. Because the technical specification $\Phi$ focuses on the functions that are extracted at the end, it needs as input a list of those "main" functions. The technical specification (can comprise an interpretation of the formal specification written in a language for accessible for human comprehension.

Next, the technical specification $\Phi$ can be compared to the initial pre-technical specification $\Theta$, ((or simply "$\Theta$"). If a mismatch is found, it could be due to one of three reasons. First, the pre-technical description $\Theta$ could be wrong and the technical specification $\Phi$ could be correct, in which case the pre-technical description $\Theta$ is updated to match the technical specification $\Phi$. Second, the pre-technical specification $\Theta$ could be correct and the technical specification $\Phi$ could be incorrect, in which case the formal specification $\Sigma$ is revised to match the pre-technical specification $\Theta$ and new extracted code 12 is generated from the updated formal specification $\Sigma'$. The third case is that both the initial technical description $\Theta$ and the technical specification $\Phi$ are incorrect (and the development of the technical specification $\Phi$ helped identify the error(s) in the initial technical description Θ). In this third case, the initial technical description Θ is updated and the process is repeated.

When the iterations of process is complete (e.g., the updated technical description Φ matches the technical specification Θ), the extracted code 12 is ready for execution by a remote computer system 14. The remote computer system 14 can be a computer system, with a single computer or multiple, inter-networked computers that are for executing the extracted code 12. The extracted code 12 can be transmitted to the remote computer system 14 via any suitable file transfer mechanism. For example, the extract code 12 could be uploaded to the remote computer system 14 via an electronic data network (e.g., the Internet), or the remote counter system 14 could be on the cloud and the extracted code 12 could be uploaded to the cloud for execution by the remote computer system 14, etc. The remote computer system 14 could be any computer system that would benefit from publicly certified software, such as computer systems where bugs or other improper, unverified operation could result in physical harm to persons or large financial losses.

Figure 2:
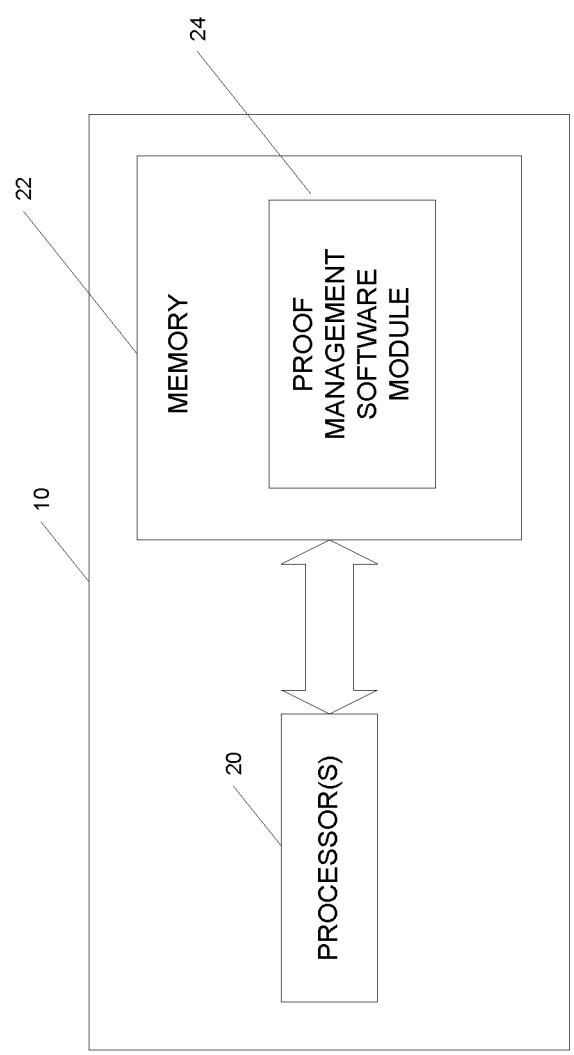
FIG. 2 is a diagram of a proof management computer system according to various embodiments of the present invention.

FIG. 2 is a diagram of the proof management computer system 10 according to various embodiments of the present invention. The proof management computer system 10, as illustrated in FIG. 2, includes one or more processors 20 and computer memory 22. The computer memory 22 may store a proof management software module 24 (e.g. proof assistant) that is executed by the processor(s) 20. The proof management software module 24 may include software, that when executed by the processor(s) 20, cause the processor(s) 20 to extract the verified code 12 from the implementation Π using, for example, Coq, as described and shown herein. Coq typically comes with libraries for efficient arithmetic in N, Z and Q, libraries about lists, finite sets and finite maps, libraries on abstract sets, relations, classical analysis, etc. Coq is typically released with: a graphical user interface based on gtk (CoqIDE); documentation tools (coqdoc and coq-tex) and a statistics tool (coqwc); dependency and makefile generation tools for Coq (coq_makefile and coqdep); and a stand-alone proof verifier (coqchk).

The computer memory 22 may comprise primary computer storage (e.g., RAM and ROM) and/or second computer storage (e.g., HDDs, SSDs, flash). The processor(s) 20 may include a microprocessor(s) that executes computer instructions (e.g., software) stored in the memory units 22, such as the software module 24 as shown in FIG. 2. For illustration purposes, the illustrated computer system 10 includes only one computer, and only one processor 20 and one computer memory 22, although it should be recognized that the present invention is not so limited and that the computer system 10 can be scaled as needed.

Figure 3:
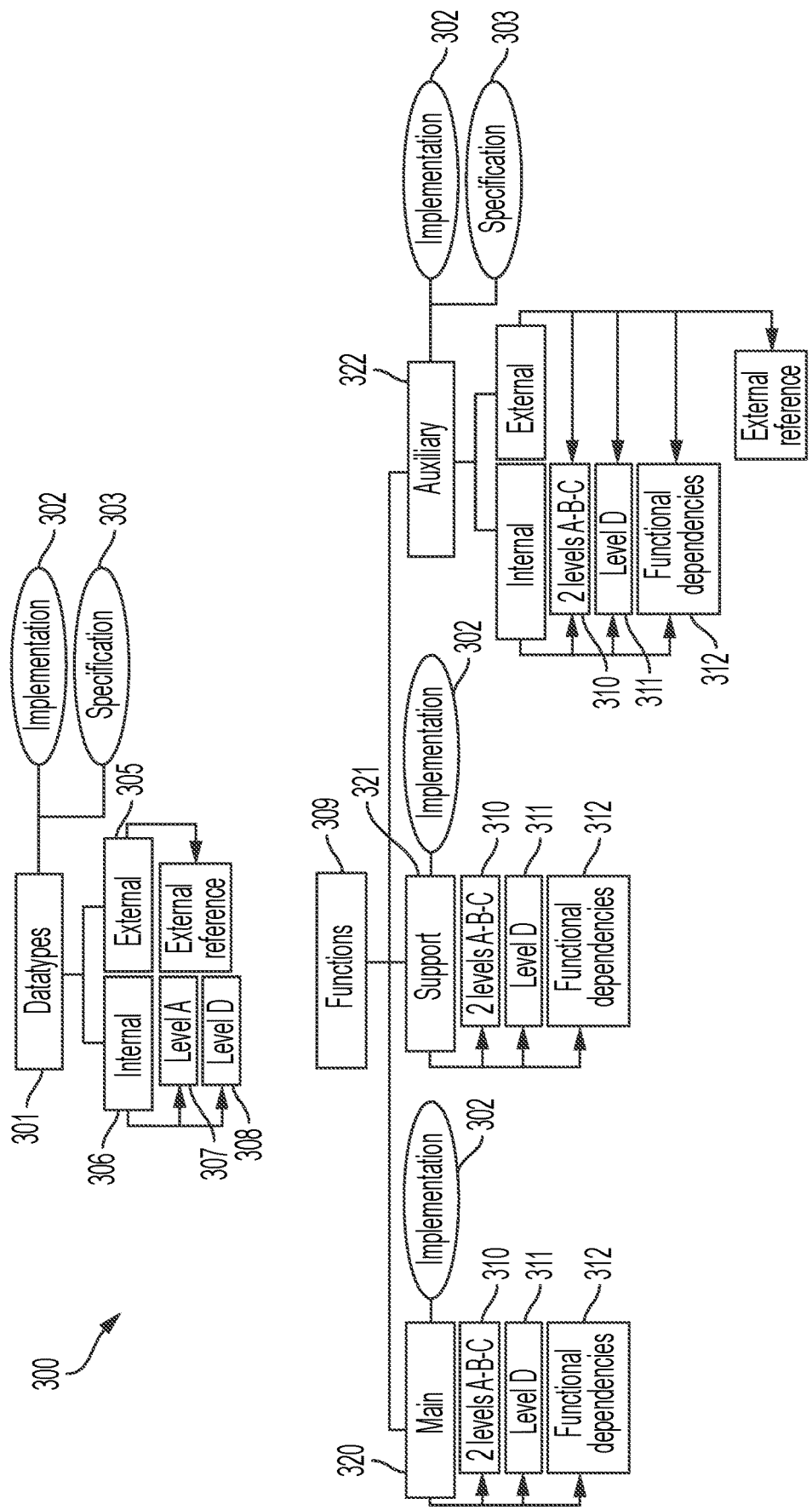
FIG. 3 is a diagram illustrating classification of datatypes and functions and levels of language required to each category of a technical specification used in the systems and methods described herein.

FIG. 3 is a diagram illustrating classification of datatypes and functions and levels of language required to each category of a technical specification used in the systems and methods described herein. The datatypes 301 that need to be documented in (are just ones that are needed to specify the main and support functions described above. These datatypes are important because they intervene directly or because they are needed as auxiliary datatypes. Each datatype that is used in the executable code must be presented in (D. There are two primary types of implementation datatypes 302—i.e., those used in the implementation code— One is external datatypes types 305 (types defined in the Coq Standard Library, in MathComp or other libraries): these only need a sentence on what they are used for, and a reference to the library where they are defined, including the version. The second is internal datatypes 306, these are types defined in the project code, and usually are needed for at least a level A specification 307 and the formal definition Level D 308.

The specification datatypes 303, which are distinguishable from implementation datatypes 302 since they are only specification-side but are nonetheless needed to understand/decipher the specification of the functions, must also be included in Φ. There are two types of specification datatypes 303: External data types 305 and internal datatypes 306. The External types (types defined in the Coq Standard Library, in MathComp or other libraries) are generally described with a sentence on what they are used for, and with a reference to the library where they are defined, (that may include the version of the library). Internal specification data types on the other hand are those also defined I the present types.

FIG. 3 also presents the structure of documenting functions 309 in Φ. The documentation of each function 309 must include the specification in at least two of the abstraction-levels Levels A-B-C 310, and the Σ (Coq) references as described in Level D 311. For each function, it is also required to include the list of functional dependencies of the specification as described herein. The list of functions 309 that are used throughout the other levels to specify it, plus the list of functions that use the current one in their respective documentation.

No explanations about the implementation are required. Φ focuses on the specification, and Coq proofs guarantee that the particular implementation fulfills the specification. In preferred embodiments, the documentation in Φ can be separated into multiple sections as follows: Main functions 320, Support functions 321, and Auxiliary functions 322.

The main functions 320 are the core of the project, the input/output functions provided to the user. Input/output is the only interaction that exists with the software from external sources, and thus it is the target of verification. Therefore, they are the definitions in the implementation side which are in the Extraction command. This implies that main functions are always located in internal, implementation files 302. All the main functions must be included and clearly marked as such.

Support functions 321 are intermediate results for a complex main function 320. It is encouraged to extract them and provide them as input/output functions so that the algorithm can be grasped correctly. This category is flexible and should be adapted to each case, depending on the complexity of the software. When an algorithm that is target of verification is complex (has many steps, its description is long and hard to understand, etc.), including support functions 321 can help ensuring that the specification is correctly understood. Support functions 321 are usually implementation and internal as well. Generally they appear in Φ clearly listed as support.

Auxiliary functions 322, for the purposes of this document, are those written to be used in definitions or specifications of other functions (main 320, support 321 or auxiliary 322), types, theorems. Not all auxiliary functions 322 must be included in the document, only those that are needed to specify the main 320 and support functions 321. There may be several levels of auxiliary functions 322, i.e., some auxiliary functions 322 will need other auxiliary functions 322 to be specified, and the levels shall go as deep as needed for the specification. Auxiliary functions 322 may be internal or external. If they are external, a clear reference to the library where they are defined is needed, as well as the version.

Auxiliary functions 322 generally appear in Φ clearly listed as auxiliary 322. The difference between auxiliary 322 and support functions 321 is that auxiliary functions 322 are included to help specify main 320 and support functions 321, hence they can be both specification or implementation functions and do not need to be input/output.

If the project contains or makes use of any axioms or admitted proofs, there must be a section listing them in at least two levels from A-B-C and Level D, with an explanation of why assuming these results is innocuous. Otherwise, the project cannot be considered publicly certified. The final section must include links to any other documents or resources the authors deem appropriate. At least, it is required to include: The pre-technical specification Θ, i.e., the document that describes the original idea for the technical specification Φ, prior to the Coq formal specification. A link to the code if it is public or can be shared with our team online, or otherwise an indication to the means that Formal Vindications can use to access the code. A link to the user documentation of the OCaml/C extraction of the project, to check that the main functions correspond between both documents.

Figure 4:
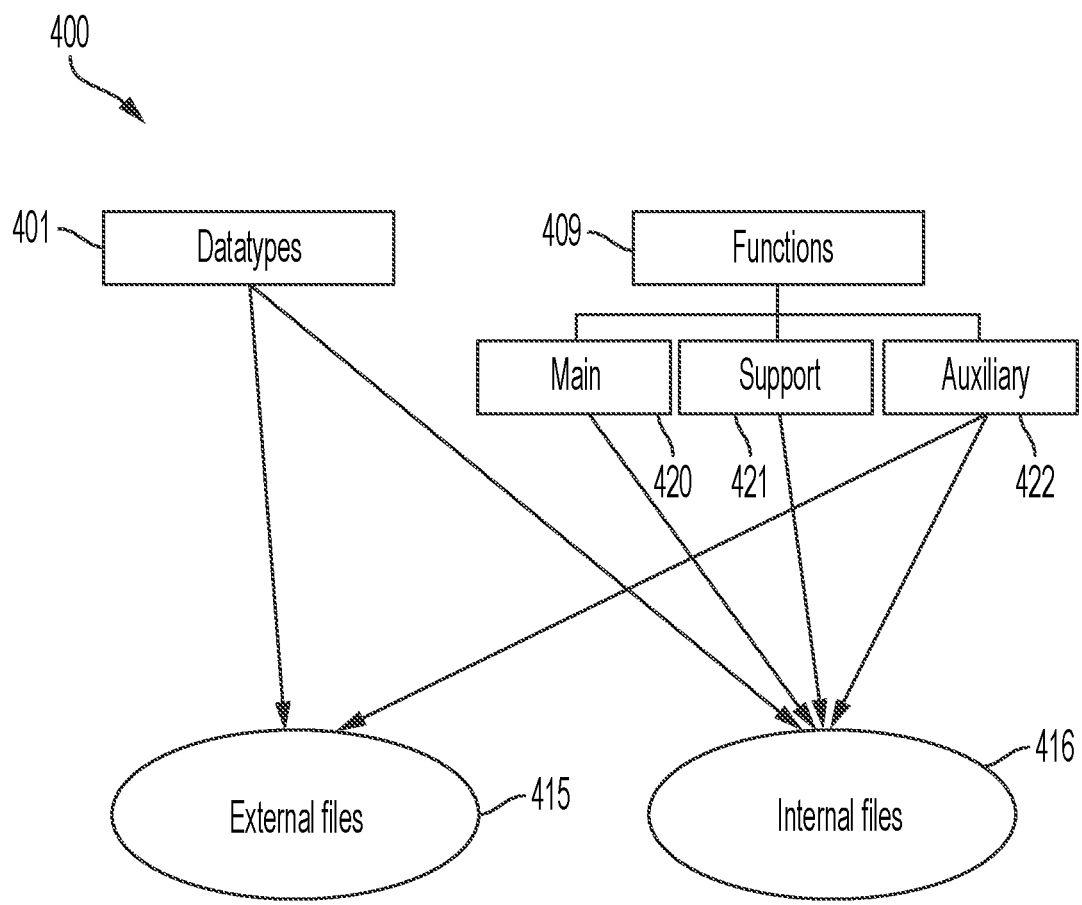
FIG. 4 is a diagram illustrating location of datatypes and functions in internal and external files and classification of datatypes and functions into specification and implementation elements used in the systems and methods described herein.

In order to reduce the gap between natural and formal language described in FIGS. 3-4, several levels of language are defined according to their abstraction and formality. Level A in Level A-B-C 310 is a pure natural language. In this level, the description is given in plain natural language. This is possibly the language used by the user of the software, who might have requested a specification written in English or any other natural language.

This level is always ambiguous. The description should be as precise and understandable as possible within those margins. This is a descriptive language, with an abstraction level of 0: a pure natural language.

Level B is a hybrid language where in this level, the description uses some well-known mathematical notations mixed with natural language. It is more precise than Level A, and must be phrased in a more mathematical way. As an orientation, descriptions in this language should be similar to descriptions of intuitive ideas written in a Mathematics textbook. Generally, notation for the application of functions here is the classical conventional one and not the λ-calculus convention (i.e., write f(x) instead of f x).

In the hybrid language level, the description uses some well-known mathematical notations mixed with natural language. It is more precise than Level A (pure natural language), and must be phrased in a more mathematical way. As an orientation, descriptions in this language should be similar to descriptions of intuitive ideas written in a Mathematics textbook. The notation for the application of functions can use the classical conventional one and not the λ-calculus convention.

The mathematical language level C entails all mathematical precision. Heavy use of mathematical symbols and notations is mixed with only some natural language words with a precise mathematical meaning. Descriptions in this language should be similar to statements of mathematical results in a Mathematics textbook or paper. The notation for the application of functions can use the λ-calculus convention. This level can make heavy use of references to other functions of the document.

In various embodiments, the formal language D 311 is Coq. Reproducing code in the document is generally discouraged, since code is better represented in its own file context. However, there are some exceptions. For each user-defined datatype, its definition as written in the code can be reproduced in a box, so that its constructors and projections are also specified at the same time, like in the following example see below. This may be done when specifying constants too. The same format can be used to reproduce any fragment of code, although again, this is discouraged.

| D. Coq |
| --- |
| Record name_of_type := Constructor {<br>    projection1 : type1;<br>    projection2 : type2;<br>}. |

The descriptions given in the levels of language A-B-C 310 should in several aspects correspond, to the specification formalized in Coq. For each function 309, there preferably exist one or several lemmas in the code stating that the function fulfills the specification. The document must provide, preferably, for all functions, a box containing the name of the function followed by a list of the lemmas that specify it. For example, if a function named function is proven to follow the specification in lemmas lemma1 and lemma2, then the box should be given as:

| Σ (Coq) |
| --- |
| function<br>• Lemma lemma1 arg1 arg2 : statement .<br>• Lemma lemma2 arg3 : statement . |

If the name of the lemmas is not unique in the project, then the file where the lemma is defined must be indicated to break ambiguity. Here the reserved word Lemma is used, but it may be any other Coq synonym: Theorem, Proposition, Remark, Fact, or Corollary.

In several aspects, any constants that are defined and used throughout the specification of the main functions or datatypes should be documented. Its purpose must be stated in at least one of the abstraction levels A-B-C 310, and the definition in formal language (Level D 311). They can be documented together with the functions (as constants are 0-ary functions) and should also be split into main and auxiliary.

The documentation of each function 309 must include the specification in at least two of the abstraction-levels Levels A-B-C 310, and the Σ (Coq) references as described in Level D 311. If the function 309 contains error handling, it is recommended to split the documentation for that function 309 between the main functionality and the error handling. In this case, the main functionality 320 can avoid mentioning input restrictions and focus only on the intended purpose of the function 309, while the error handling makes the input restrictions explicit. Generally, no explanations about the implementation are required. Coq proofs guarantee that the particular implementation, whatever it is, fulfills the specification.

The main functions 320 must be clearly distinguished from the auxiliary functions 322. It is thus recommended to separate them into three sections: documentation of main functions; documentation of support functions; and documentation of auxiliary functions.

FIG. 4 is a diagram illustrating location of datatypes and functions in internal and external files and classification of datatypes and functions into specification and implementation elements in a technical specification used in the systems and methods described herein. Functions 409 defined and described may be of three primary types, Main functions 420, support functions 421, and auxiliary functions 422.

These functions 420-422 may all be linked to internal files 416, while only the auxiliary functions 422 may be connected, linked to, or utilize external files 415. The defined datatypes 401 in Φ may be linked or connected to the external files 415 or the internal files 416

In regards to functional dependencies, for each function, there must be a box in the specification documentation containing the list of dependencies of the function, in both directions. For example for auxiliary functions 422: a list of the functions that are auxiliary for specifying the function, i.e., all the functions that appear in the previous boxes of the current one. Auxiliary of: a list of the functions that use the current one as auxiliary for their own specification, i.e., all the functions in whose boxes the current one appears. For example, if a function named function uses function1 and function2 in its specification, and moreover appears in the specification of function3, and assuming that function2 is defined in external libraries, then then the box should be given as:

| Functional dependencies |
| --- |
| Auxiliary functions:<br>• function1<br>• function2 (external)<br>Auxiliary of:<br>• function3 |

This information defines a graph of dependencies between the main 420 and support functions 421 (implementation), and those functions that serve the purpose of specifying them (which could be both from the specification or the implementation side). The presentation as a graph (tree) of dependencies may be required. In several aspects, the dependency between functions and lemmas should be represented as a tree graph. Not every function and lemma in the project should appear—only the functions that are qualified as main, support or auxiliary (to any depth) must be represented in the graph, plus those lemmas and relations which appear in some box of level D language.

In addition to the above, technical specification Φ also utilizes a specific style. Since the names of Coq terms and types belong to the formal specification Σ, they are special words that should be clearly distinguished from plain text and never translated into other languages. For example, there is a difference between the English word "true", which can be translated into any language, and the Coq term true, which is a term of type bool and is the same in any language. Therefore, we require that these reserved words have a special style to distinguish them from natural language.

In some aspects, there is a requirement that reserved words must be clearly distinguished from regular text, using color boxes, special typographies or text colors, or whatever choice clearly identifiable. In some aspects, it is recommended to use various highlights for the several kinds of reserved words. Usual kinds are the names of: 1. Types. 2. Functions. 3. Constants. 4. Lemmas, theorems, propositions. 5. Tactics. 6. Code files. And 7. Standard tools (programming languages, libraries, etc.).

An example of this would be distinguishing the following kinds of reserved words:

References to types, functions and constants that are specified in the same document are written like name. These are clickable and jump to the page where the specification for name is given. In case your development repeats names across different code files, the less dependent files need to be qualified, as in file_name.function_name.

References to types, functions and constants that are part of the Coq or MathComp standard libraries are written like name. These are not clickable.

References to theorems that are proven in the code but not shown in the same document, or to Coq tactics, or to code files, are written like: theorem_name, tactic, file_name.

The names of standard tools are written with sans-serif font, like in Coq and MathComp.

In several aspects there is a requirement that reserved words referencing types, functions or constants specified in the same document must be clickable and jump to the page where they are specified. Reserved words referencing Coq/Math Comp definitions that are not specified in the same document must be distinguished and not clickable.

Apart from these words that can appear in the middle of the text, boxes with Coq code or references as described may be reserved and non-translatable. In some aspects, there is a requirement that Coq code must appear in gray boxes, with a header "D. Coq".

With reference now in combination with FIG. 3. In regard to error handling: When describing a main or support function with error handling, it is recommended to split the documentation in two items: one focused on the functionality without considering errors, and then the list of errors and preconditions.

Thus the structure of the documentation would be

Documentation of the function without considering errors, as described in main functions (two levels from A-B-C, level D and functional dependencies).

Documentation of the errors: For each error, a description of the preconditions that give rise to the error in two levels A-B-C 310, level D 311 and functional dependencies. If the error is simple, just one level from A-B-C 310 is enough The technical specification Φ as described in FIGS. 3-4 may comprise a schema that sets out documentation as follows:

1. Preliminary content (Introduction). Including:
   Purpose of the project.
   File structure of the code project.
   List of specification files.
   List of implementation files.
   List of auxiliary files.
   References to external libraries used and their version.
   Description of the particular methods.
   Description of the treatment of reserved words.
2. Documentation of datatypes.
   (a) Documentation of implementation datatypes. Including:
      If they are external types: reference to the external library and version.
      If they are internal types: Level A and Level D.
   (b) Documentation of specification datatypes. Including:
      If they are external types: reference to the external library and version.
      If they are internal types: Level A and Level D.
3. Documentation of functions. The functions must be classified in sections:
   (a) Documentation of main functions. Each function must include:

Description: in two from Levels A-B-C, Level D and the functional dependencies.
    If the name of a lemma in Level D is not unique in the project, the file must be indicated.
    Error handling: if the function has error handling, keep it separated in a special subsection where the list of errors is given in the same levels of language.
(b) Documentation of support functions. Each function must include:
    Description: in two from Levels A-B-C, Level D and the functional dependencies.
    If the name of a lemma in Level D is not unique in the project, the file must be indicated.
    Error handling: if the function has error handling, keep it separated in a special subsection where the list of errors is given in the same levels of language.
(c) Documentation of auxiliary functions.
    Component: implementation or specification.
    Location: internal or external.
        If it is external, include a reference to the library and version.
    Description: in two from Levels A-B-C, Level D and the functional dependencies.
        If the name of a lemma in Level D is not unique in the project, the file must be indicated.
4. Documentation of axioms and admitted statements. For each axiom or admitted statement:
    Description in two portions from Levels A-B-C and Level D.
    An explanation of why the statement is assumed.
5. Other documentation. Including at least:
    (a) The original document explaining the project, Θ.
    (b) The Coq code of the project.
    (c) Documentation of the extracted code.

A final section of the technical specification Φ preferably includes links to any other documents or resources the authors deem appropriate. At least, the final section should be required to include: the pre-technical specification, i.e., the document that describes the original idea for the specification, prior to the Coq formal specification Σ; a link to the code if it is public or can be shared with the team online, or otherwise an indication to the means that certifier can use to access the code; and a link to the user documentation of the extraction of the project to languages such as OCaml or C, to check that the main functions correspond between both documents.

The technical specification Φ preferably follows the above-described structure and includes the above-described sections, although the technical specification Φ could include other sections in various implementations.

Figure 5:
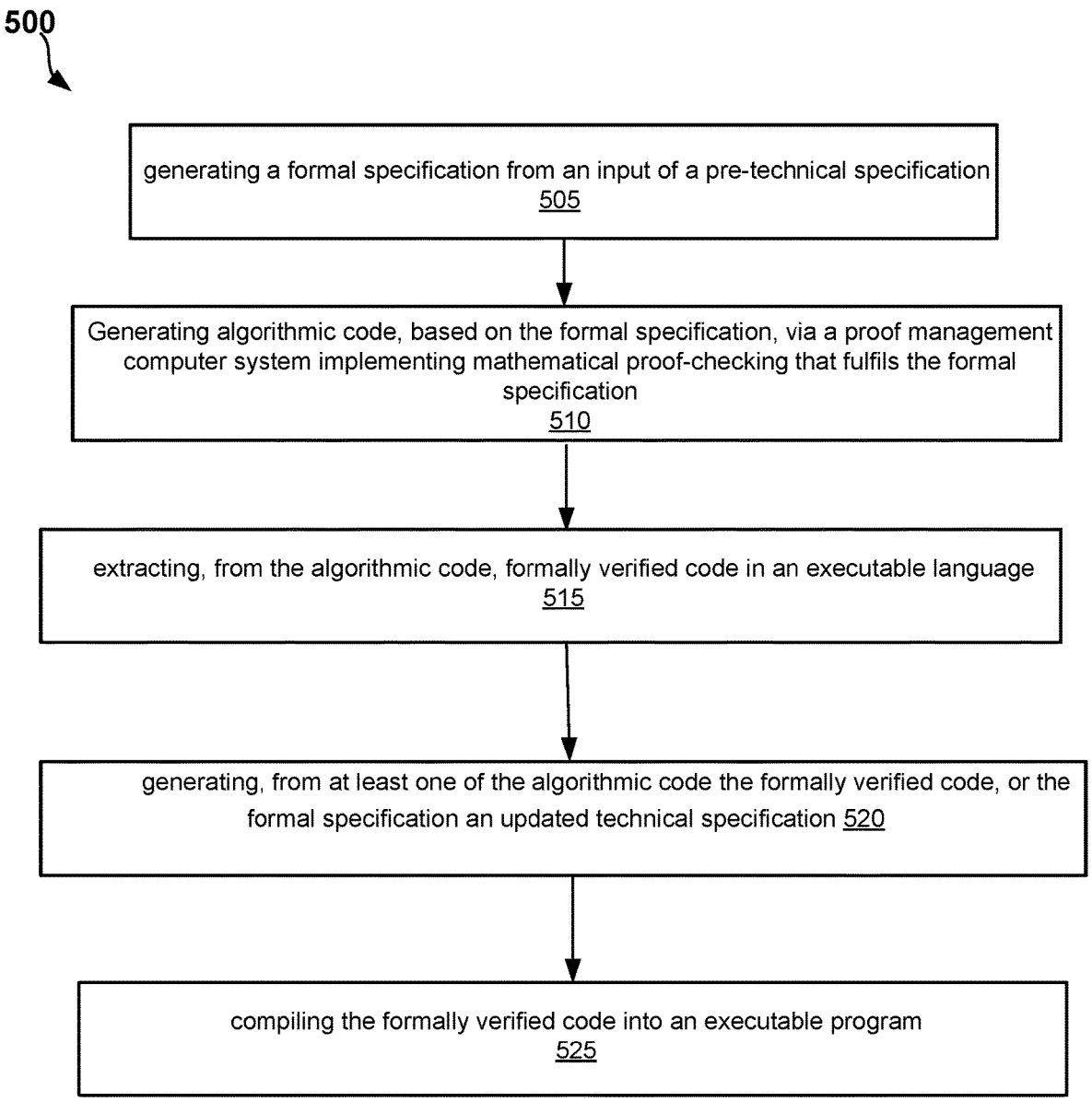
FIG. 5 illustrates a flow diagram for one method of automated public verification of software.

FIG. 5 illustrates a flow diagram for one method of automated public verification of software. In one aspect, method 500 can be fully or partially automated, with all or some combination of its various processes discussed herein undertaken automatically and without human intervention and in any order. Method 500 can include automatically or semi-automatically generating 505 a formal specification Σ. In several aspects, Σ is generated from the pre-technical specification Θ manually, semi-automatically, or automatically. In various aspects, all the processes related to the generating 505 can be undertaken by a proof management system which may be run on any of the computing systems, apparatuses, components, and/or devices described herein, in various aspects, these may implement a Coq proof management system that undertakes mathematical proof-checking that fulfils the formal specification any of the systems, or processors described herein. In several aspects, the method 500 includes automatically or semi-automatically generating 510 algorithmic code, for example via semi-automated proofs (Δ), that could be based on the formal specification, via a proof management computer system implementing mathematical proof-checking that fulfils the formal specification. This could be done for example via a Coq proof assistant (Coq is a formal language interpreter that allows the writing of theorem statements and proofs. Proofs are written using special keywords named "tactics". Tactics are basically commands that summarize usual proof steps, so each tactic advances a step in the proof, until the proof is completed. Coq assists the programmer by keeping track of the state of the proof, and making sure it is correctly done and closed when the programmer says it's finished (preventing human errors).

Tactics must be carefully selected by a programmer. This can be a complex process, where the programmer will most likely try several different tactics before arriving at a correct combination that closes the proof. Each tactic is in itself an automation of a small part of the process.

Upon the generation 510 of the algorithmic code, the method 500 can in various aspects proceed to automatically extract 515 formally verified code from the algorithmic code. Method 500 can also comprise generating 520, from at least one of the formal specification Σ, the algorithmic code, or the formally verified code, or a combination thereof, a technical specification Φ wherein the technical specification comprises an interpretation of the formal specification written in a language for accessible for human comprehension. In several aspects once this is completed, the formally verified code is compiled 520 into an executable program, app, applet, script, etc. (all interchangeably referred to herein as "program") via a verified compiler, e.g., a Compcert verified compiler. In several aspects, an automated or semi-automated script or program prompts a programmer to classify all definitions and lemmas (theorems) that it provides according to their type (main, auxiliary, support functions . . . ), for example via an interactive user interface, which keeps track of the relations between functions datatypes and the like, and prompt the programmer to fill in required information such as details for each function/datatype, etc. In several aspects, the generation 520 of the technical specification Φ occurs after the code is manually written or automatically/semi-automatically generated (although not necessarily after the proofs are finished). In preferred aspects, once the formal specification and the algorithmic code are ready (or generated), the technical specification is generated 520 and then compared with the user needs (for example, by being compared to the original description/pre-technical specification). In various aspects, if some anomaly is detected, one or more of the formal specification, the algorithmic code, or the technical specification are updated. These updates can change the proofs (so, if proofs were already done, additional work is undertaken to amend or adapt the proofs) and in various aspects are either fully or semi-automated.

In various aspects, if the formally verified code displays any unexpected behavior when compiled and/or executed for example, the method 500 ensures that this misbehavior is reflected in the technical specification Φ. Thus, when an error or unexpected behavior is detected, displayed or identified, in various aspects, it is corrected and then propagated along the various components of the method 500, for example in the formal specification, the algorithmic code, and the proofs. Following this, method 500 automatically extracts the corrected formally verified code for compilation and execution.

In current technologies, bugs can be obscure or difficult to identify or locate in code, and/or in a formal specification (that only a handful of experts can understand). The systems and methods described herein make any issues or bugs in the code accessible and identifiable a final user through $\Phi$, and/or to an executable program that can amend or automatically correct the code.

The verified automated extraction process in several aspects can comprise a command in Coq, to extract one or more functions to a file automatically. In many aspects, Coq can include an "erasure" process, which eliminates parts of Coq code used for mathematical purposes of Coq but not relevant for execution. After erasure, code is generated that includes the relevant for execution, this goes through "translation" to the target language syntax, giving the desired result. This process itself is verified in a MetaCoq project.

In some aspects, the method 500 may also include automatically executing the compiled program, for example on the same or a different device, apparatus, or system as the one that undertook the other processes of method 500. Method 500 can comprise compiling 525 at least one of the formally verified code, a revised formally verified code, or an updated formally verified code into an executable program. The compilation 525 or the execution of the code may be dependent on the code being verified by the system.

In several embodiments, method 500 can comprise automatically or semi-automatically generating 520, from the extracted verified code, a technical specification $\Phi$, wherein the technical specification $\Phi$ comprises an interpretation of the formal specification written in a language for accessible for human comprehension. The technical specification $\Phi$ can be based on one or more of: the formal specification $\Sigma$, the original technical specification, the algorithmic code, or formally verified implementation code ("also referred to herein as "formally verified code"), or combinations thereof.

In various aspects, a determination must be made as to whether one or more of: the formal specification $\Sigma$, the technical specification $\Phi$, the algorithmic code, or the formally verified implementation code, meet an objective, purpose or standard for the software. The objectives or purpose of the software may be set out or defined by the non-technical description document $\Theta$. For example it may be determined that the technical specification $\Phi$ may be missing a certain feature or requirement that should have been present according to the original description document $\Theta$ and/or the original technical specification $\Phi$. Therefore these features may be added in a specific manner to an updated technical specification $\Phi'$ or revised version of the technical specification $\Phi$ from which the method 500 can generate an updated formal specification $\Sigma'$ and/or algorithmic code.

In several aspects, many of these processes related to method 500 are undertaken by a proof management computer system that implements a Coq proof management system including and not limited to the generating 505 of the formal specification and the updated formal specification. Method 500 can also comprise executing, by a computer system, the executable program.

In several aspects the formal specification $\Sigma$ is then revised based on the updated technical specification $\Phi'$, for example by generating an updated or revised formal specification $\Sigma'$, similar to the generating 505, or by just updating the initial formal specification $\Sigma$ based on the updated technical specification $\Phi'$ or revised $\Phi$ which includes revisions or updates to specific portions that do not meet the objectives of the software or design, for example as set out by the description document $\Theta$.

In numerous aspects, method 500 can also comprise automatically generating updated algorithmic code from the updated formal specification; and automatically extracting, from the updated algorithmic code, the updated formally verified code in an executable language.

In various aspects, method 500 can comprise determining whether the technical specification $\Phi$ meets an objective of the software/executable program, wherein the determination is based in comparisons between one or more of the technical specification $\Phi$, the formal specification $\Sigma$, a non-technical description document $\Theta$, the formally verified code, or the algorithmic code; the method can also comprise revising the technical specification to meet the objective of the software to generate a revised technical specification $\Phi'$; generating a revised formal specification $\Sigma'$ from the revised technical specification $\Phi'$; generating revised algorithmic code implementing the revised formal specification $\Sigma'$; and extracting, from the revised algorithmic code, revised formally verified code in an executable language.

Figure 6:
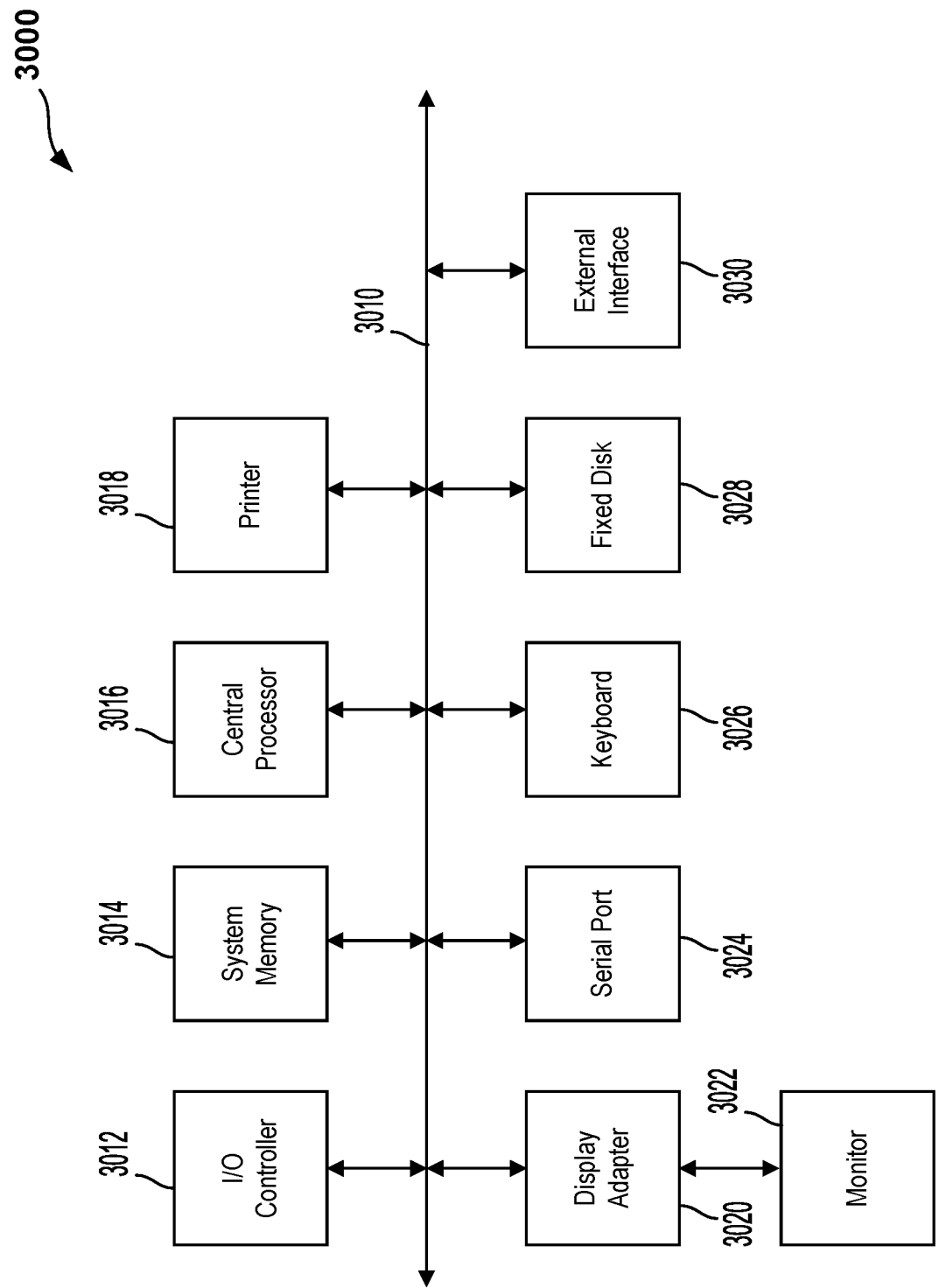
FIG. 6 is a block diagram of a computer apparatus with data processing subsystems or components, according to at least one aspect of the present disclosure.

FIG. 6 is a block diagram of a computer apparatus 3000 with data processing subsystems or components, according to at least one aspect of the present disclosure. The subsystems shown in FIG. 6 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Figure 7:
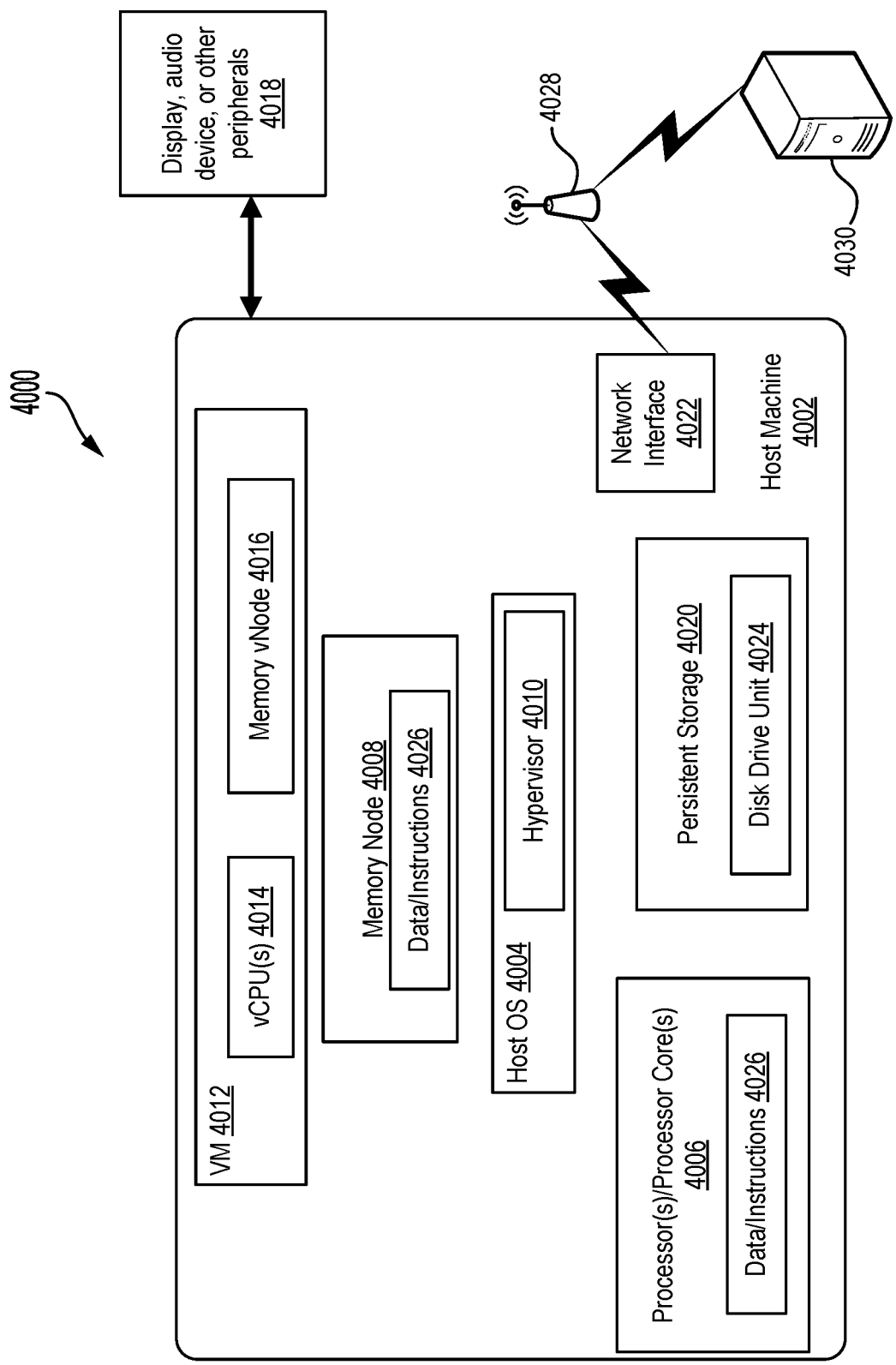
FIG. 7 is a diagrammatic representation of an example system that includes a host machine within which a set of instructions to perform any one or more of the methodologies discussed herein may be executed, according to at least one aspect of the present disclosure.

FIG. 7 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V34 or V34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A method for automated public verification of software, the method comprising generating algorithmic code, based on a formal specification, via a proof management computer system implementing mathematical proof-checking that fulfils the formal specification, wherein the formal specification comprises a mathematical description and a theorem based on a pre-technical specification; automatically extracting, from the algorithmic code, formally verified code in an executable language; generating, from at least one of the algorithmic code or the formal specification, a technical specification, wherein the technical specification comprises an interpretation of the formal specification written in a language for accessible for human comprehension; and compiling at least one of the formally verified code, or an updated formally verified code into an executable program.

Clause 2. The method of Clause 1 further comprising generating an updated formal specification, based on an updated technical specification; generating updated algorithmic code from the updated formal specification; and automatically extracting, from the updated algorithmic code, the updated formally verified code in an executable language.

Clause 3. The method of any of Clauses 1-2, wherein the compiling of the formally verified code is based on a determining that the technical specification meets an objective for the software based on a comparison between one or more of the technical specification, a description document, the algorithmic code, and the formally verified code.

Clause 4. The method of any of Clauses 1-3, further comprising determining that the technical specification does not meet an objective for the software based on a comparison between one or more of the technical specification, a description document, the algorithmic code, and the formally verified code.

Clause 5. The method of any of Clauses 1-4 further comprising determining that the technical specification does not meet an objective for the formally verified code or the executable program, based on unexpected behavior of the formally verified code or the executable program, wherein the determination is based comparisons between one or more of the technical specification, a non-technical description document, the formally verified code, or the algorithmic code; and generating an updated technical specification, based on the determining that the technical specification does not meet the objective.

Clause 6. The method of any of Clauses 1-5 further comprising executing, by a computer system, the executable program.

Clause 7. The method of any of Clauses 1-6, wherein the generating of the updated algorithmic code comprises using a proof management computer system implementing mathematical proof-checking that fulfils the formal specification.

Clause 8. The method of any of Clauses 1-7 wherein the proof management computer system utilizes Coq.

Clause 9. The method of any of Clauses 1-8 wherein the updated formally verified code is extracted via the proof management computer system implementing a Coq proof management system.

Clause 10. The method of any of Clauses 1-9 further comprising comparing the updated technical specification to the technical specification; determining based on the comparing whether the updated technical specification meets an objective of the software, wherein the determination is based comparisons between one or more of the technical specification, a non-technical description document, the formally verified code, or the algorithmic code; revising the technical specification to meet the objective of the software to generate a revised technical specification; generating a revised formal specification from the revised technical specification; generating revised algorithmic code implementing the revised formal specification; and extracting, from the revised algorithmic code, revised formally verified code in an executable language.

Clause 11. The method of any of Clauses 1-10 wherein the technical specification defines data types for implementation comprising implementation data types and specification data types.

Clause 12. The method of any of Clauses 1-11 wherein the technical specification defines one or more types of functions comprising main functions, support functions, or auxiliary functions.

Clause 13. The method of any of Clauses 1-12, further comprising inputting a list comprising the main functions into at least one of the technical specification or the updated technical specification.

Clause 14. The method of any of Clauses 1-13, wherein the main functions verification targets, wherein the main functions are extracted and provided as a library or as input/output functions.

Clause 15. The method of any of Clauses 1-14, wherein the main functions are the verification target, the main functions are extracted and provided as a library or as input/output functions.

Clause 16. The method of any of Clauses 1-15, wherein the technical specification comprises at least one of a natural language, a mathematical language, and a formal language.

Clause 17. The method of any of Clauses 1-16, wherein the proof management computer system utilizes a Coq language, wherein the Coq language implements a program specification and mathematical higher-level language.

Clause 18. A system for public verification of software, the system comprising: at least one computing device comprising a processor, the processor configured to generate a formal specification from an original pre-technical specification of a software project; generate algorithmic code, based on the formal specification, via a proof management computer system implementing mathematical proof-checking that fulfils the formal specification, wherein the formal specification comprises a mathematical description and a theorem; extract, from the algorithmic code, formally verified code in an executable language; generate, from at least one of the algorithmic code, the formal specification, or the formally verified code, a technical specification, wherein the technical specification comprises an interpretation of the formal specification written in a language for accessible for human comprehension; compile at least one of the formally verified code, a revised formally verified code, or an updated formally verified code into an executable program; and execute the executable program.

Clause 19. A non-transitory computer readable medium having embodied thereon a program, the program being executable by a processor to perform a method for public verification of software, comprising automatically generating algorithmic code, based on a formal specification, via a proof management computer system implementing mathematical proof-checking that fulfils the formal specification; automatically extracting, from the algorithmic code, formally verified code in an executable language; automatically generating, from at least one of the algorithmic code, the formal specification, or the formally verified code, a technical specification, wherein the updated technical specification comprises an interpretation of the formal specification written in a language for accessible for human comprehension; compiling at least one of the formally verified code, a revised formally verified code, or an updated formally verified code into an executable program; and automatically executing the executable program.

Clause 20. The non-transitory computer readable medium of Clause 19, wherein the program further comprises generating an updated formal specification, based on an updated technical specification; generating updated algorithmic code from the updated formal specification; and automatically extracting, from the updated algorithmic code, the updated formally verified code in an executable language.

The software for the various modules described herein and other computer functions described herein may be implemented in computer software using any suitable computer programming language, such as NET, C, C++, or Python, and using conventional, functional, or object-oriented techniques. For example, the various machine learning systems may be implemented with software modules stored or otherwise maintained in computer readable media, e.g., RAM, ROM, secondary storage, etc. One or more processing cores (e.g., CPU) of the computer system 10 may then execute the software modules to implement the function of the computer system. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Coq, Fortran, Java, Lisp, Pascal, Object Pascal, Haskell, ML; and examples of scripting languages include Bourne script, JavaScript, Python, Ruby, Lua, PUP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for automated public verification of software, the method comprising:
   generating algorithmic code, based on a formal specification, via a proof management computer system implementing mathematical proof-checking that fulfils the formal specification, wherein the formal specification comprises a mathematical description and a theorem based on a pre-technical specification;
   automatically extracting, from the algorithmic code, formally verified code in an executable language;

generating, from at least one of the algorithmic code or the formal specification, a technical specification, wherein the technical specification comprises an interpretation of the formal specification written in a language for accessible for human comprehension;

compiling at least one of the formally verified code, or an updated formally verified code into an executable program;

comparing an updated technical specification to the technical specification; and determining, based on the comparing, whether the updated technical specification meets an objective for the software, wherein the determination is based on comparisons between one or more of the technical specification, a non-technical description document, the formally verified code, or the algorithmic code.

2. The method of claim 1 further comprising:

generating an updated formal specification, based on the updated technical specification;

generating updated algorithmic code from the updated formal specification; and automatically extracting, from the updated algorithmic code, the updated formally verified code in an executable language.

3. The method of claim 1 wherein the compiling of the formally verified code is based on a determination that the technical specification meets an objective for the software based on a comparison between one or more of the technical specification, a description document, the algorithmic code, and the formally verified code.

4. The method of claim 1 further comprising:

determining that the technical specification does not meet an objective for the software based on a comparison between one or more of the technical specification, a description document, the algorithmic code, and the formally verified code.

5. The method of claim 1 further comprising:

determining that the technical specification does not meet an objective for the formally verified code or the executable program, based on unexpected behavior of the formally verified code or the executable program, wherein the determination is based comparisons between one or more of the technical specification, a non-technical description document, the formally verified code, or the algorithmic code; and generating an updated technical specification, based on the determining that the technical specification does not meet the objective.

6. The method of claim 1 further comprising:

executing, by a computer system, the executable program.

7. The method of claim 2 wherein the generating of the updated algorithmic code comprises using a proof management computer system implementing mathematical proof-checking that fulfils the formal specification.

8. The method of claim 5 wherein the proof management computer system utilizes Coq.

9. The method of claim 1 wherein the updated formally verified code is extracted via the proof management computer system implementing a Coq proof management system.

10. The method of claim 1 further comprising:

revising the technical specification to meet the objective of the software to generate a revised technical specification;

generating a revised formal specification from the revised technical specification;

generating revised algorithmic code implementing the revised formal specification; and extracting, from the revised algorithmic code, revised formally verified code in an executable language.

11. The method of claim 1 wherein the technical specification defines data types for implementation comprising implementation data types and specification data types.

12. The method of claim 1 wherein the technical specification defines one or more types of functions comprising main functions, support functions, or auxiliary functions.

13. The method of claim 12, further comprising:

inputting a list comprising the main functions into at least one of the technical specification or the updated technical specification.

14. The method of claim 12 wherein the main functions verification targets, wherein the main functions are extracted and provided as a library or as input/output functions.

15. The method of claim 12, wherein the main functions are the verification target, the main functions are extracted and provided as a library or as input/output functions.

16. The method of claim 1, wherein the technical specification comprises at least one of a natural language, a mathematical language, and a formal language.

17. The method of claim 1, wherein the proof management computer system utilizes a Coq language, wherein the Coq language implements a program specification and mathematical higher-level language.

18. A system for public verification of software, the system comprising:

at least one computing device comprising a processor, the processor configured to:

generate a formal specification from an original pre-technical specification of a software project;

generate algorithmic code, based on the formal specification, via a proof management computer system implementing mathematical proof-checking that fulfils the formal specification, wherein the formal specification comprises a mathematical description and a theorem;

extract, from the algorithmic code, formally verified code in an executable language;

generate, from at least one of the algorithmic code, the formal specification, or the formally verified code, a technical specification, wherein the technical specification comprises an interpretation of the formal specification written in a language for accessible for human comprehension;

compile at least one of the formally verified code, a revised formally verified code, or an updated formally verified code into an executable program; and execute the executable program;

compare an updated technical specification to the technical specification; and determine, based on the comparing, whether the updated technical specification meets an objective for the software, wherein the determination is based on comparisons between one or more of the technical specification, a non-technical description document, the formally verified code, or the algorithmic code.

19. A non-transitory computer readable medium having embodied thereon a program, the program being executable by a processor to perform a method for public verification of software, comprising:

automatically generating algorithmic code, based on a formal specification, via a proof management computer system implementing mathematical proof-checking that fulfils the formal specification;

automatically extracting, from the algorithmic code, formally verified code in an executable language;

automatically generating, from at least one of the algorithmic code, the formal specification, or the formally verified code, a technical specification, wherein the technical specification comprises an interpretation of the formal specification written in a language for accessible for human comprehension;

compiling at least one of the formally verified code, a revised formally verified code, or an updated formally verified code into an executable program;

automatically executing the executable program;

comparing an updated technical specification to the technical specification; and determining, based on the comparing, whether the updated technical specification meets an objective for the software, wherein the determination is based on comparisons between one or more of the technical specification, a non-technical description document, the formally verified code, or the algorithmic code.

20. The non-transitory computer readable medium of claim 19, wherein the program further comprises:

generating an updated formal specification, based on the updated technical specification;

generating updated algorithmic code from the updated formal specification; and automatically extracting, from the updated algorithmic code, the updated formally verified code in an executable language.

* * * * *